(12) United States Patent
Chatterjee et al.

(10) Patent No.: US 12,431,712 B2
(45) Date of Patent: Sep. 30, 2025

(54) SYSTEMS AND METHODS FOR CONTROL OF DISTRIBUTED ENERGY RESOURCES

(71) Applicant: Caterpillar Inc., Peoria, IL (US)

(72) Inventors: Srideep Chatterjee, Bhopal (IN); Vineeth Wilson, Kerala (IN); Kevin J. Sergott, Dunlap, IL (US); Sowmya Nagesh, Peoria, IL (US); Suresh B. Reddy, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 452 days.

(21) Appl. No.: 17/930,955

(22) Filed: Sep. 9, 2022

(65) Prior Publication Data

US 2024/0088668 A1    Mar. 14, 2024

(51) Int. Cl.
  *H02J 3/38*      (2006.01)
  *H02J 3/00*      (2006.01)
  *H02J 13/00*     (2006.01)

(52) U.S. Cl.
  CPC .............. *H02J 3/381* (2013.01); *H02J 3/007* (2020.01); *H02J 13/00006* (2020.01); *H02J 13/00036* (2020.01)

(58) Field of Classification Search
  CPC ...... H02J 3/381; H02J 3/007; H02J 13/00006; H02J 13/00036; H02J 2310/10; H02J 1/10; H02J 13/00004
  See application file for complete search history.

(56) References Cited

U.S. PATENT DOCUMENTS 9,158,294 B2   10/2015 Carralero et al.
10,635,058 B2   4/2020 Sanders et al.
(Continued)

FOREIGN PATENT DOCUMENTS

CN   108599974 B   12/2020
EP     3493346 A1    6/2019

OTHER PUBLICATIONS

Caldognetto Tommaso et al: "Experimental verification of an active microgrid with distributed power-based control", 2015 17th European Conference on Power Electronics and Applications (EPE'15 ECCE—Europe), Jointly Owned by EPE Association and IEEE PELS, Sep. 8, 2015 (Sep. 8, 2015), pp. 1-8, XP032800288, DOI: 10.1109/EPE.2015.7309333 [retrieved on Oct. 27, 2015].

(Continued)

*Primary Examiner* — Ziaul Karim
(74) *Attorney, Agent, or Firm* — Bookoff

(57) ABSTRACT

Systems and methods are disclosed for controlling distributed energy resources. Controllers in a peer-to-peer network are configured to act as a dispatch handler for electrical buses connected to respective set of power assets and loads. The controllers are configured to broadcast micro-grid configuration information over the peer-to-peer network to each controller. Each controller is configured to determine a segmentation of the electrical buses into isolated micro-grids; and assign a controller as a supervisor for each of the isolated micro-grids. The controllers are configured such that supervisor controller assigned to isolated micro-grid is configured to determine dispatch commands for power assets associated with the isolated micro-grid to handle load requirements and broadcast the determined dispatch commands over the peer-to-peer network. Each controller is configured to transmit determined dispatch commands to power assets electrically connected to the electrical bus for which the controller acts as dispatch handler to handle the load requirements.

19 Claims, 11 Drawing Sheets

(56) References Cited

U.S. PATENT DOCUMENTS

| | | | | |
|---|---|---|---|---|
| 2007/0114796 A1* | 5/2007 | Garces | ............... | F03D 9/14 |
| | | | | 290/43 |
| 2010/0138070 A1* | 6/2010 | Beaudoin | ............ | F03D 7/0284 |
| | | | | 700/297 |
| 2011/0215640 A1* | 9/2011 | Donnelly | ............... | H02J 3/466 |
| | | | | 307/21 |
| 2012/0283888 A1* | 11/2012 | Mao | .................. | H02J 3/381 |
| | | | | 700/286 |
| 2016/0112310 A1* | 4/2016 | Forbes, Jr. | ............ | H04L 45/72 |
| | | | | 370/389 |
| 2019/0237283 A1* | 8/2019 | Pabst | ................. | H02H 1/0069 |
| 2019/0267838 A1* | 8/2019 | Majumder | ............... | H02J 3/46 |
| 2020/0348633 A1* | 11/2020 | Thorpe | ................ | G05B 15/02 |
| 2021/0194724 A1* | 6/2021 | Lee | .................. | H04J 14/0283 |
| 2022/0166218 A1 | 5/2022 | Majumder | | |

OTHER PUBLICATIONS

Written Opinion and International Search Report for Int'l. Patent Appln. No. PCT/US2023/072206, mailed Dec. 7, 2023 (14 pgs).

\* cited by examiner

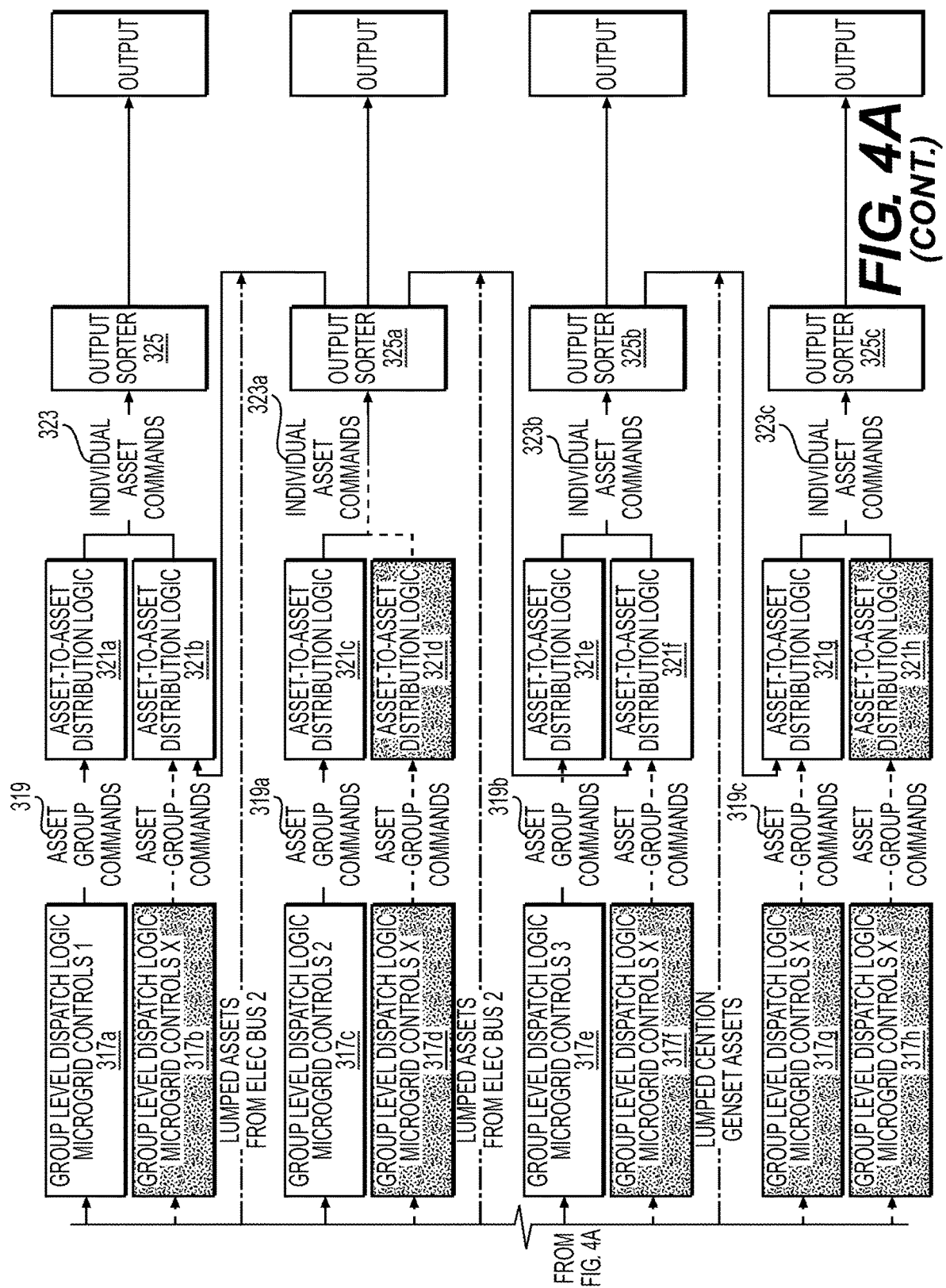

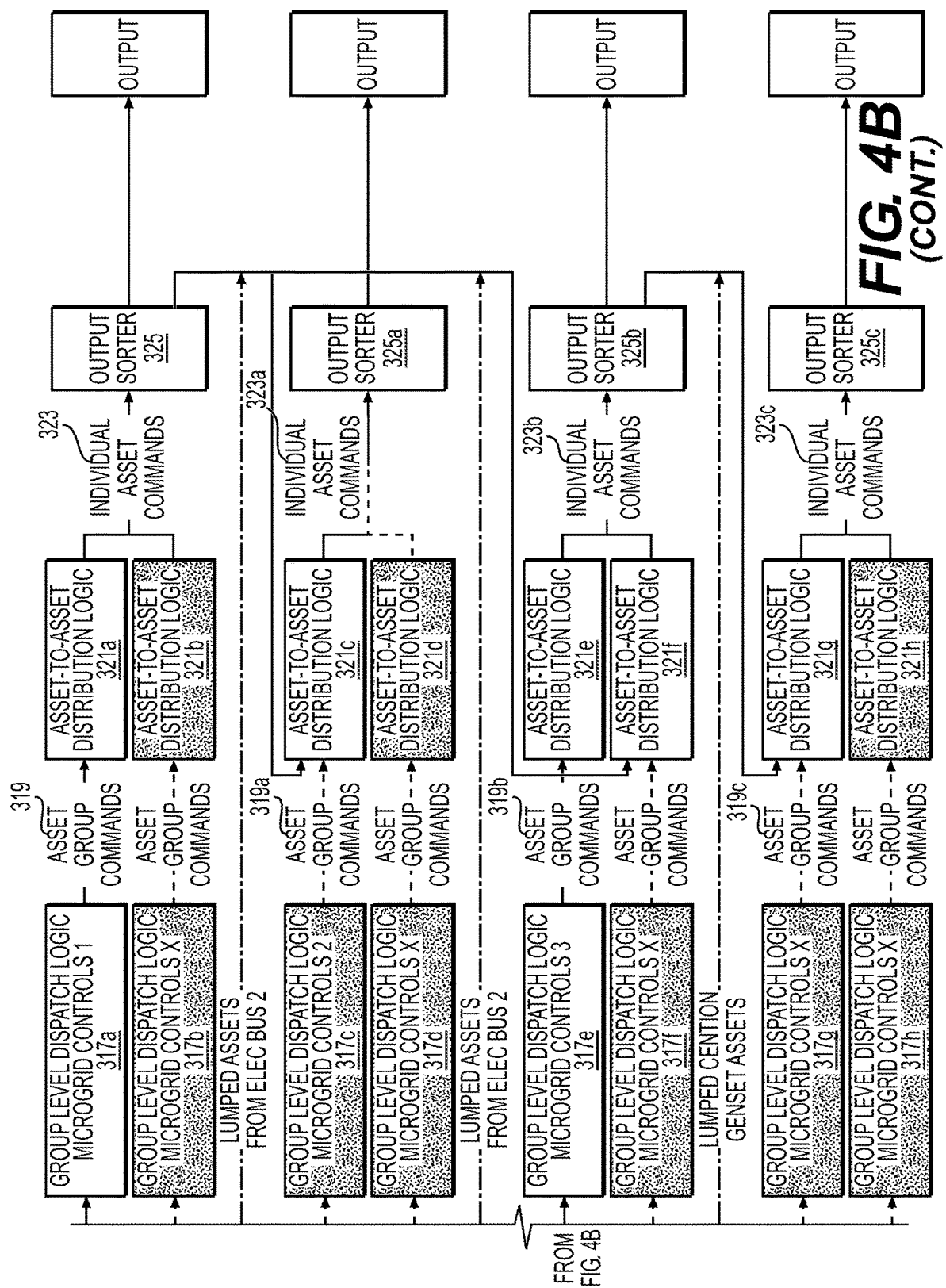

SYSTEMS AND METHODS FOR CONTROL OF DISTRIBUTED ENERGY RESOURCES

TECHNICAL FIELD

The present disclosure relates generally to control of electric power equipment, and more particularly, to systems and methods for control of distributed energy resources.

BACKGROUND

Micro-grids generally refers to a power system that includes a set of localized electric power generation sources. Such sources may operate connected to, and synchronous with, a traditional centralized grid, but may be configured to disconnect and function autonomously, e.g., to allow for the integration of smaller power sources. Micro-grids generally have several advantages over a typical centralized power distribution network, such as robustness against failure in the centralized grid, and lower transmission losses due to local power generation and consumption. However, existing control systems for micro-grids tend to be centralized and/or require complex network systems. Such centralized control systems for micro-grids introduce a single point of failure. The centralized control system also generally must be custom-built for a specific application, which discourages changes in the system by way of adding new resources, thereby reducing adaptability.

U.S. Pat. No. 9,158,294 B2, granted on Oct. 13, 2015 ("the '294 patent"), discloses a method for re-aligning a set of micro-grid elements to form a second grid configuration in response to status data from a set of micro-grid elements indicating a reconfiguration of the micro-grid, whereby re-aligning means changing one or more task(s) associated with a micro-grid element, changing a load associated with a distributed energy resource, and/or changing relationships between elements and distributed energy resources within a micro-grid. However, this approach may require a micro-grid control center that may introduce a single point of failure. Further, this approach considers micro-grid elements on a per-element basis, and may not account for various aspects of how a micro-grid may be configured or interconnected, such as positions of breakers that electrically interconnect separate electrical busses.

The disclosed method and system may solve one or more of the problems set forth above and/or other problems in the art. The scope of the current disclosure, however, is defined by the attached claims, and not by the ability to solve any specific problem.

SUMMARY

According to certain aspects of the disclosure, methods and systems are disclosed for a distributed control system to control micro-grids.

In one aspect, a distributed micro-grid control system may include a plurality of controllers connected to each other in a peer-to-peer network. Each controller of the plurality of controllers is configured to act as a dispatch handler for one or more electrical bus from a plurality of electrical buses that, in each case, are connected to a respective set of power assets and loads. The plurality of controllers are further configured to broadcast micro-grid configuration information over the peer-to-peer network to each controller. Each controller is further configured to determine, based on the micro-grid configuration information: a segmentation of the plurality of electrical buses into one or more isolated micro-grids; and an assignment of a respective controller of the plurality of controllers as a supervisor for each of the one or more isolated micro-grids. The plurality of controllers are further configured such that each controller assigned as the supervisor to an isolated micro-grid is configured to determine dispatch commands for power assets associated with the isolated micro-grid to handle load requirements and broadcast the determined dispatch commands over the peer-to-peer network. Each controller is further configured to transmit determined dispatch commands to power assets electrically connected to the one or more electrical bus for which the controller acts as dispatch handler to handle the load requirements.

In another aspect, a distributed micro-grid may include a plurality of power assets; a plurality of electrical buses, each electrical bus electrically connected to a respective set of the plurality of power assets; and a plurality of controllers connected to each other in a peer-to-peer network. Each controller of the plurality of controllers is configured to act as a dispatch handler for one or more electrical bus from the plurality of electrical buses that, in each case, are connected to a respective set of power assets and loads. The plurality of controllers are further configured to broadcast micro-grid configuration information over the peer-to-peer network to each controller. Each controller is further configured to determine, based on the micro-grid configuration information: a segmentation of the plurality of electrical buses into one or more isolated micro-grids; and an assignment of a respective controller of the plurality of controllers as a supervisor for each of the one or more isolated micro-grids. The plurality of controllers are further configured such that each controller assigned as the supervisor to an isolated micro-grid is configured to determine dispatch commands for power assets associated with the isolated micro-grid to handle the load requirements and broadcast the determined dispatch commands over the peer-to-peer network. Each controller is further configured to transmit determined dispatch commands to power assets electrically connected to the one or more electrical bus for which the controller acts as a dispatch handler to handle the load requirements.

In a further aspect, a controller for a distributed micro-grid control system may include at least one memory storing instructions; and at least one processor operatively connected to the at least one memory and configured to execute the instructions to perform operations, including: broadcasting, over a peer-to-peer network on which the controller is one of a plurality of controllers, micro-grid configuration information; determining, based on the micro-grid configuration information provided over the peer-to-peer network: a segmentation of a plurality of electrical buses connected to the plurality of controllers into one or more isolated micro-grids; and an assignment of a respective controller of the plurality of controllers as a supervisor for each of the one or more isolated micro-grids. In response to the assignment of the controller as the supervisor for one of the one or more isolated micro-grids: determining dispatch commands for power assets associated with the isolated micro-grid to handle load requirements; and broadcasting the determined dispatch commands over the peer-to-peer network. In response to receiving, via the peer-to-peer network, the dispatch commands for power assets associated with one or more electrical bus for which the controller acts as a dispatch handler, transmitting the dispatch commands to the associated power assets to handle load requirements.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. The term "or" is used disjunctively, such that "at least one of A or B" includes, A, B, A and A, A and B, etc. Moreover, in this disclosure, relative terms, such as, for example, "about," "substantially," "generally," and "approximately" are used to indicate a possible variation of ±10% in the stated value.

A centralized control system for micro-grids negates one or more of the advantages offered by the distributed nature of micro-grids, e.g., robustness against a single point of failure. In one instance, a centralized control system may have a central point of contact, i.e., a centralized controller or control center, which may receive/collect information from a plurality of power assets and loads in distributed locations. The controller may process the information, and may transmit commands to each of the individual assets. In such a centralized power distribution network, a failure in one line of communication with the controller results in loss of control of the power assets associated with that line of communication. Furthermore, a failure of the controller results in the failure of the entire network.

In the centralized control system, scalability is generally limited. In other words, the number of power assets controllable by a centralized controller is limited by the capability, e.g., input/output (I/O) limitation, processing power limitation, etc., of the centralized controller. Such limitations may discourage or complicate the addition of new resources to the system. Furthermore, such a centralized control system generally requires specifically tailored control logic, which may increase expense and/or may lead to lower adoption. There is a need for advances in the control technology for micro-grids.

Figure 1:
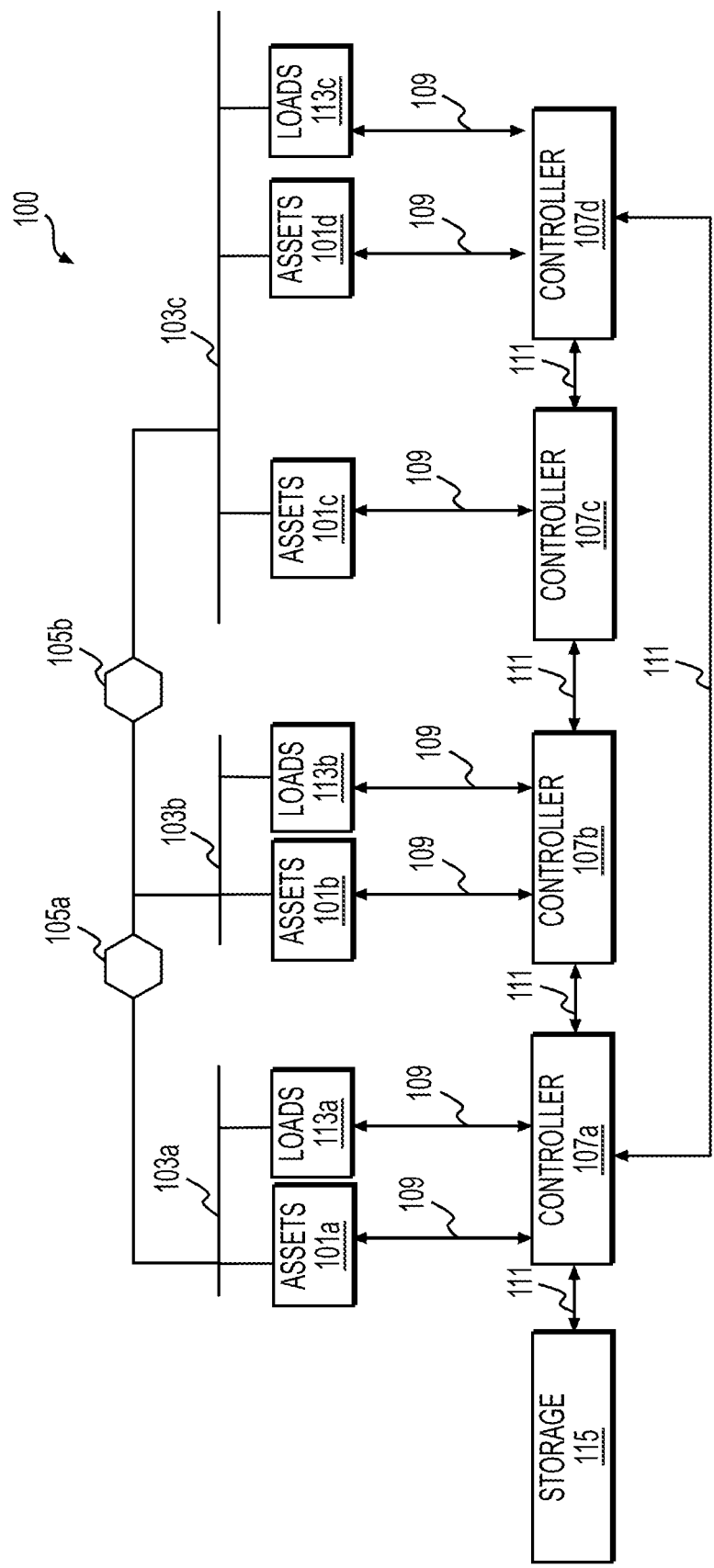
FIG. 1 depicts a schematic of an exemplary distributed control system to control micro-grids, according to aspects of the disclosure.

FIG. 1 depicts an exemplary micro-grid 100 that may be utilized with techniques presented herein. By way of example, micro-grid 100 may include power assets 101a-101d (collectively referred to as power assets 101), controllers 107a-107d (collectively referred to as controllers 107), loads 113a-113c (collectively referred to as loads 113), and storage 115 operatively connected to each other via intermediary devices, such as electrical buses 103a-103c (collectively referred to as electrical buses 103), breakers 105a-105b (collectively referred to as breakers 105), Modbus 109, or common industrial protocol (CIP) micro-grids 111.

In one instance, micro-grid 100 may distribute control of power assets 101 across the different controllers 107. For example, micro-grid 100 may operate without a centralized controller or central control center. In addition, various embodiments of the micro-grid 100 may range from a simple set-up, e.g., single-digit assets without tie-breakers, to a complex set-up, e.g., a large number of assets with multiple tie-breakers, multiple mini micro-grids, and multiple utility connections. Conventionally, varying micro-grid configurations may be associated with different custom solutions. A customized case-by-case solution may not be robust to changing micro-grid configurations, and may be excessive and/or uneconomical for simple systems. The micro-grid 100 according to this disclosure may be modular and/or scalable, and may provide a mechanism for partitioning control functions among various modular controllers based on on-site configuration situations.

Further, the micro-grid 100 may be robust to changes. In one instance, micro-grid 100 may be a peer-to-peer network. Such a peer-to-peer network may be an ad hoc network that may be configured to dynamically add or remove power assets 101, electrical buses 103, breaker 105, controllers 107, etc. Robustness to addition/removal of elements may result in the micro-grid 100 being infinitely scalable. For example, as electrical buses 103 and/or accompanying power assets 101 are added or removed to the network, controllers 107 may also be reconfigured, re-assigned, and/or added or removed as needed. In one instance, each power assets 101 may be electrically connected to a specific controller 107 via electrical buses 103. Similarly, power assets 101 may be connected to controllers 107 via any communication protocols, e.g., Modbus 109, and controllers 107 may be connected to each other via CIP micro-grids 111. In one instance, a micro-grid control system may be configured to scale with the micro-grid, e.g., controllers 107 may be added or removed to the network together with electrical buses 103, power assets 101, and loads 113. In such a manner, the micro-grid control system may grow with the size and complexity of the micro-grid.

In one instance, components in the peer-to-peer network may be connected to each other in a ring architecture that may be configured to provide network redundancy, e.g., each controller 107 is connected to the network by multiple channels of communication.

As will be discussed in detail below, in micro-grid 100, each controller 107 acts as dispatch handler for power assets 101 electrically connected with one or more electrical busses that are associated with the controller 107. However, that controller 107 may or may not be responsible for supervision of those power assets 101. In other words, in some instances, as discussed in further detail below, a controller 107 different than the controller 107 connected to an electrical bus 103 may be responsible for determining dispatch commands for the power assets 101 connected to that electrical bus 103.

For example, in micro-grid 100, each of the connected controllers 107 may broadcast information regarding what elements it is connected to across the peer-to-peer network. Further each of the controllers 107, using such broadcast information may be configured to determine the overall configuration of the network, e.g., the position of breaker(s) 105, and may use the overall configuration to determine an efficient configuration for assigning which controller 107 supervises the power assets 101 associated with the different electrical busses. A supervisory controller 107 may, for example, determine dispatch commands for the power assets 101 it supervises, and then may broadcast such dispatch commands to the controller(s) 107 that handle those power assets 101.

In one instance, power assets 101 may include gensets, photovoltaic groups, an energy storage system, fuel cell groups, a power grid connection, a wind turbine, a hydro turbine, a pumped hydro, any other type of power generation units, or the like or combinations thereof. In one instance, gensets may have operational characteristics such as apparent power limits, active power rating limits, power factor range limits, a predetermined, regulated, and/or designed minimum load capacity, a start/stop frequency limit or threshold, a maximum load capacity, total operational lifetime, current operational age, fuel consumption rate, power output, maintenance cost, replacement cost, etc. Such characteristics may be predetermined, e.g., set during manufacture or established via regulatory requirement, or may vary over the course of operation or the lifetime of the gensets. It should be understood that in various embodiments, various power assets may be included or omitted in micro-grid 100 instead of or in addition to the power assets listed above. It should also be understood that power assets 101 listed above are exemplary only, and any suitable power assets may be included in any suitable arrangement. In one instance, power assets 101 may include any suitable number of power assets, e.g., 1, 5, 10, 100, 150, etc. Power assets 101 may be operatively connected within micro-grid 100 in any suitable manner. In one instance, power assets 101 may be connected to each other via various intermediary devices, such as, electrical buses 103, a transformer, a sub-station, an inverter, a rectifier, a load balancer, or the like. In one instance power assets 101 may be connected to controller 107 via any communication protocols, e.g., Modbus 109.

In one instance, electrical buses 103 may include a plurality of parallel wires, conductors, and the like that distribute electrical signals from source devices, e.g., power assets 101, to the various electrical devices coupled to the bus, e.g., loads 113. In one instance, one or more electrical buses 103 may be electrically connected to one or more power assets 101 in any suitable arrangement. In another instance, one or more electrical buses 103 may be electrically connected to one or more controller 107 in any suitable arrangement. Any suitable type of electrical bus may be used, e.g., a hybrid electric bus (HEB), a fuel cell electric bus (FCEB), a battery electric bus (BEB), etc.

In one instance, breakers 105 may include a pair of separable contacts that may be operated automatically in response to a detected fault condition, manually via a user-adjusted setting, automatically in response to an automated instruction, e.g., for a load-balancing operation, according to a predetermined schedule, e.g., to connect or disconnect photovoltaic assets based on a duty cycle, or for any other suitable purpose. For example, breakers 105 may open the separable contacts to interrupt the current through the interconnected electrical buses in response to detected abnormalities, e.g., the occurrence of an overload or short circuit electrical current in the network. Breakers 105 may close the separable contacts to allow power to flow through the interconnected electrical buses. Any suitable type of breakers may be used, e.g., tie-breakers, load circuit breakers, inter-micro-grid circuit breakers, etc.

In one instance, controllers 107 may include multiple interconnected components, e.g., one or more servers, intelligent networking devices, computing devices, and corresponding software, to monitor, track, and/or control the operation of micro-grid 100. As will be discussed in further detail below, controllers 107 may be configured to optimize the operation of power assets 101 of different types, e.g., improve efficiency, maintain the integrity of power assets 101, or the like. In one instance, controllers 107 may be connected to each other via CIP micro-grids 111. In another instance, controllers 107 may be connected to each other via a communication network. The communication network may include a data network, a wired or wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including 5G (5th Generation), 4G, 3G, 2G, Long Term Evolution (LTE), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one instance, controllers 107 may be connected in a peer-to-peer network, wherein each controller 107 may be configured to act as a dispatch handler for one or more electrical buses 103 connected to the respective set of power assets 101. In one instance, controllers 107 may be configured to broadcast micro-grid configuration information over the peer-to-peer network. In one instance, the micro-grid configuration information may include a quantity or position of one or more breakers 105 that electrically interconnect the plurality of electrical buses 103, a quantity, status, or load of the plurality of controllers, a quantity or status of the respective sets of power assets, and/or a requirement or status of a plurality of loads.

As discussed in more detail below, controllers 107 may segment electrical buses 103 into isolated micro-grids based on the micro-grid configuration information. In one instance, controllers 107 may assign at least one controller 107 as a supervisor for the isolated micro-grids. In one instance, controllers 107 may apply a predetermined assignment logic or algorithm to determine supervisor assignments based on network configuration data available over the network. In one instance, controllers 107 may, as a response to a change in the micro-grid configuration information, update the segmentation of the plurality of electrical buses 103 into the one or more isolated micro-grids and/or update the assignment of the controller 107 as the supervisor for the isolated micro-grids. In one instance, the number of controllers 107 acting as a supervisor is equal to the number of isolated micro-grids, wherein each of the one or more isolated micro-grids operate independently and asynchronously.

In one instance, supervisor controller 107 may determine dispatch commands for power assets 101 associated with the isolated micro-grid and may broadcast the dispatch commands over the peer-to-peer network to other controllers 107. The other controllers 107 that receive the dispatch commands may transmit the dispatch command to power assets 101 which are electrically connected to the electrical buses 103 for which controllers 107 act as a dispatch handler.

In one instance, controllers 107 may classify power assets 101 based, at least in part, on asset type. The classified power assets 101 may be aggregated to determine an optimal power dispatch. Controllers 107 may determine the dispatch commands based, at least in part, on the optimal power dispatch. In one instance, controllers 107 may process historical data for power assets 101 to determine power generation capability, wherein the historical data includes past power generation information. Controllers 107 may broadcast such power generation capability of power assets 101 over the peer-to-peer network to actively manage power supply distribution to loaders 113.

In one instance, loads 113 may include any number of systems, devices, or the like to be powered by micro-grid 100, for example, building electronic power systems, air conditioning systems, machines, or the like. In some instances, a portion of load 113 may be automatic, e.g., a system or device that has a predetermined schedule of operation. In some instances, a portion of load 113 may be at least partially predictable, e.g., systems or devices like air conditioning systems that operate in correlation to ambient temperature or building electronic power systems that operate in correlation to business hours, or the like. In some instances, a portion of load 113 may be user controlled, such as appliances, machines, or the like. In some instances, a portion of load 113 may be controllable by controller 107.

In one instance, storage 115 may be batteries, a capacitor bank, or any suitable electronic or mechanical device that can retain and discharge energy as an electric current. However, in various embodiments, any suitable type of storage system may be used such as, for example, a flywheel, a thermal energy storage system, pumped hydroelectric storage, pneumatic energy storage, etc. In one instance, controller 107 may communicate with storage 115 via a communication network. In one instance, power assets 101 may generate a surplus of electric power, whereupon controller 107 may store the excess power or energy in storage 115. In one instance, loads 113 may request additional power that is beyond the power generating capabilities of power assets 101. Controller 107 may instruct storage 115 to supply the stored power or energy power to loads 113.

Although depicted as separate components in FIG. 1, it should be understood that a component or portion of a component in micro-grid 100 may, in some embodiments, be integrated with or incorporated into one or more other components. In some embodiments, operations or aspects of one or more of the components discussed above may be distributed amongst one or more other components. Any suitable arrangement and/or integration of the various components and devices of micro-grid 100 may be used.

Further, it should be understood that, in some instances, components such as power assets 101, loads 113, storage 115, electrical buses 103, breakers 105, or the like may include sensors or other components (not shown) configured to determine, sense, and/or record state information for the component (e.g., operating state, other connected components, power capacity or demand, maintenance state, etc.), and to transmit such information to other components in the micro-grid 100, e.g., a controller 107.

While several of the examples above involve a micro-grid, it should be understood that techniques according to this disclosure may be adapted to any suitable type of application for a distributed power system. It should also be understood that the examples above are illustrative only. The techniques and technologies of this disclosure may be adapted to any suitable activity.

Figure 2:
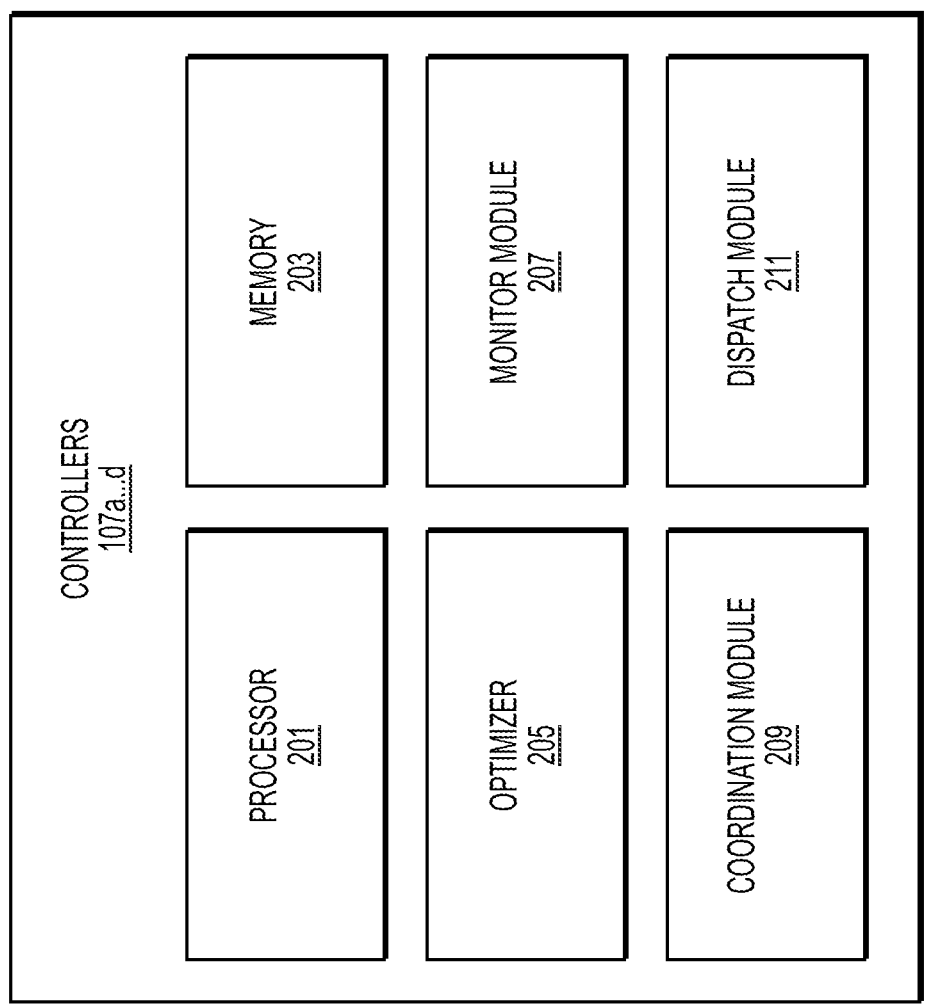
FIG. 2 is a diagram of the components of controllers 107, according to aspects of the disclosure.

FIG. 2 is a diagram of the components of controllers 107, according to one example embodiment. As used herein, terms such as "component" or "module" generally encompass hardware and/or software, e.g., that a processor or the like may use to implement associated functionality. By way of example, controllers 107 includes one or more components for a distributed control system for micro-grids control. It is contemplated that the functions of these components may be combined in one or more components or performed by other components of equivalent functionality. In one instance, controllers 107 comprises processor 201, memory 203, optimizer 205, monitor module 207, coordination module 209, and dispatch module 211, or any combination thereof.

In one instance, processor 201 may include one or more microprocessors, central processing unit (CPU) devices, computing devices, microcontrollers, digital signal processors, or like devices. Processor 201 may receive instructions from memory 203 or like device, and execute those instructions, thereby performing one or more processes defined by those instructions for controlling micro-grid 100.

In one instance, memory 203 may store data and/or software, e.g., instructions, models, algorithms, equations, data tables, or the like, that are usable and/or executable by processor 201 to perform one or more operations for controlling micro-grid 100. For example, memory 203 may include one or more optimizers 205 that, when executed by processor 201, are configured to generate commands that optimize the operation of micro-grid 100. In one instance, optimizers 205 may use algorithms which take into account information from other modules to make and provide an output of certain energy-related determinations, e.g., whether it is best to produce the energy and store it, pull energy from storage 115 to meet the demands of loads 113, etc.

In one instance, monitor module 207 may monitor, e.g., in real-time or near real-time, the micro-grid configuration, and may update one or more modules to optimize micro-grid 100. For example, monitor module 207 may monitor the addition or removal of electrical buses 103 and the accompanying set of assets 101, addition or removal of controller 107, addition or removal of breakers 105, changes in the position of breaker 105, e.g., open or closed. In another instance, monitor module 207 may monitor the frequency and voltage of power on electrical buses 103, and may alert one or more modules upon determining the frequency and voltage exceeds the maximum threshold. In a further instance, monitor module 207 may monitor the condition of the micro-grid, and may disconnect the micro-grid from the distributed network to operate independently in response to power disruption. In one instance, monitor module 207 may monitor the capacity of controllers 107, e.g., the capability of controllers 107 to control the number of power assets 101, energy generation capacity of power assets 101, and demands of loads 113.

In one instance, coordination module 209 may act as an arbitrator between controllers 107 to designate at least one controller 107 as a supervisor for the isolated micro-grids. For example, monitor module 207 may detect a load problem within the distributed network, and coordination module 209 may coordinate with controllers 107 to elect at least one controller 107 as the supervisor for the isolated micro-grid to handle the load problem. In one instance, coordination module 209 may segment electrical buses into isolated micro-grids based, at least in part, on the position of the breakers. For example, electrical buses A and B are electrically connected by breaker 1, and electrical buses B and C are electrically connected by breaker 2. When breakers 1 and 2 are in a closed position, electrical buses A, B, and C may form micro-grid ABC. However, if breaker 1 is in an open position, coordination module 209 may segment micro-grid ABC into isolated micro-grid A and isolated micro-grid BC. In one instance, controllers 107 may exchange, in real-time or near real-time, micro-grids configuration information with each other, and may elect at least one controller 107 as the supervisor based on the micro-grids configuration information, capacity information, or a combination thereof. As previously discussed, a plurality of electrical buses A, B, and C, which are electrically connected by breakers, may form micro-grid ABC. In this instance, a group level dispatch logic may be given a unique identification (ID) based, at least in part, on the number of directly connected electrical buses. For an isolated micro-grid BC from the micro-grid ABC, a group level dispatch logic with the lowest unique ID may be elected as the supervisor. However, it should be understood that in various embodiments, any suitable scheme or technique for assigning a supervisor may be used.

In one instance, dispatch module 211 may determine a dispatch command and communicates the dispatch command to other modules for further processing. In one instance, dispatch module 211 may determine dispatch commands for power assets 101 associated with the isolated micro-grid and may broadcast the dispatch commands over the peer-to-peer network. In one instance, dispatch module 211 may determine an optimal power dispatch for the aggregated set of assets, and may determine the dispatch commands for the power assets based, at least in part, on the optimal power dispatch.

The above-presented modules and components of controllers 107 may be implemented in hardware, firmware, software, or a combination thereof. The various executions presented herein contemplate any and all arrangements and models.

Figure 3:
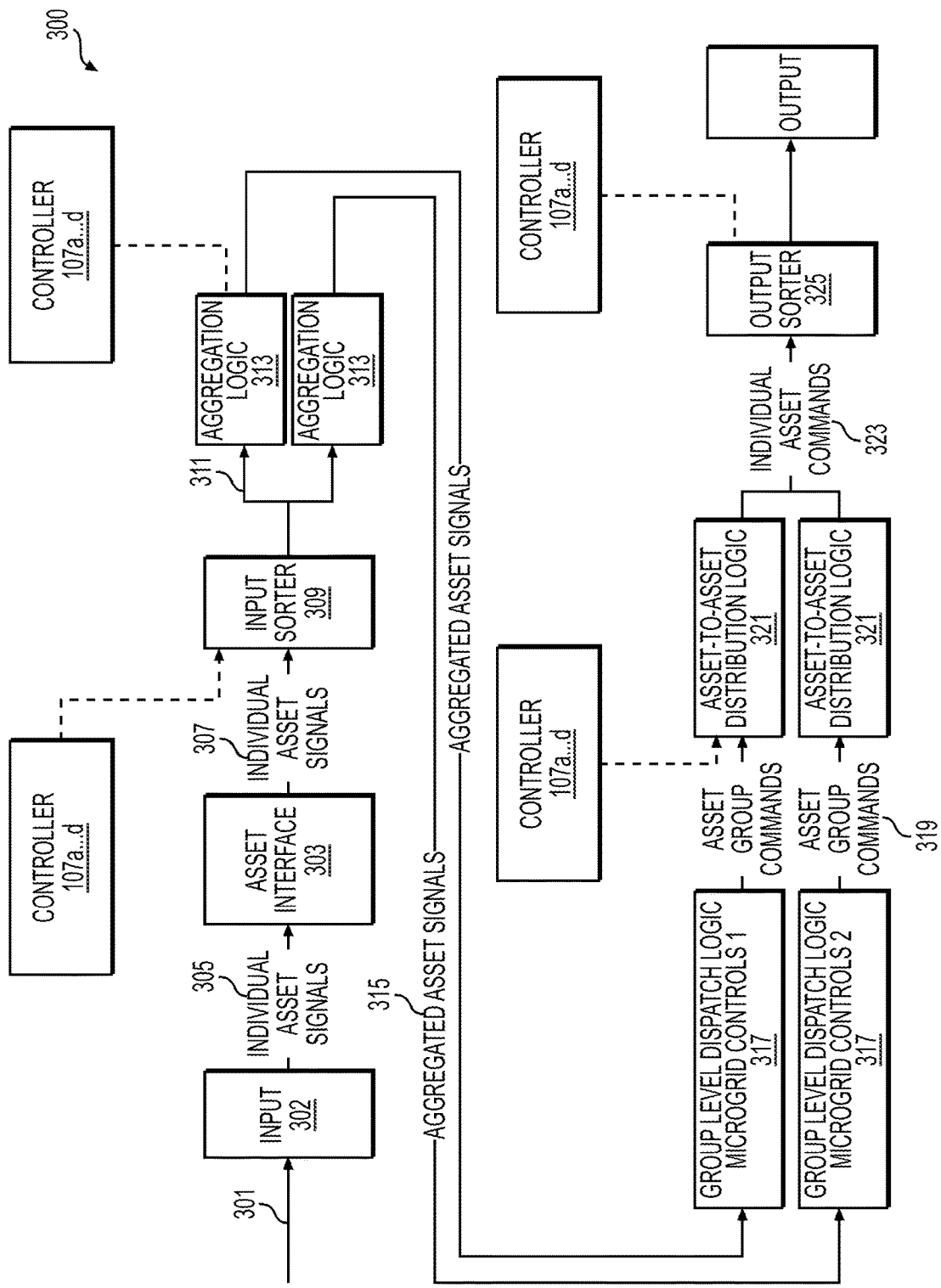
FIG. 3 is an architecture diagram that illustrates interactions between various components of a distributed control network for micro-grids control, according to aspects of the disclosure.

FIG. 3 is an architecture diagram that illustrates a schematic 300 of interactions between various components of a distributed control network for micro-grids control, according to one example embodiment. Although schematic 300 is illustrated and described as a flow of operations between components, it is contemplated that various embodiments of schematic 300 may be performed in any order or combination and need not include all of the illustrated steps.

In step 301, power assets 101 may communicate with input 302 via any communication protocols, e.g., MODBUS. In one instance, power assets 101 may communicate capacity information, e.g., power generation information, and operational characteristics data to input 302. However, it should also be understood that power assets 101 may communicate any other information to input 302.

In step 305, asset interface 303 may receive data from input 302. Asset interface 303 may convert, via any data conversion mechanism, the data, e.g., raw data, received from input 302 to uniform data that is familiar to controllers 107. In one instance, various types of power assets 101 may provide power data in different measurements, e.g., kilowatt, watt, kilowatt hour, state-of-charge (SOC), etc. Asset interface 303 may perform a unit conversion on these different measurements, via any unit conversion mechanisms. The varying measurements are converted to a uniform measurement that is familiar to controllers 107. Such data conversion may enhance data processing, and may result in uniform treatment of the various type of power assets 101.

In step 307, input sorter 309 may sort electrical buses 103 and associated power assets 101 into electrically isolated networks, e.g., isolated micro-grids, based, at least in part, on breaker positions. In one instance, electrical buses 103 may be connected via tie-breakers or any other electrical breaker devices. In one instance, a plurality of power assets 101 may be spread across different electrical buses 103, e.g., there may be 1000 power assets 101 connected by various breakers 105. If all breakers 105 are closed, the plurality of power assets 101 are electrically connected to each other via electrical buses 103, and the micro-grid 100 is a single isolated micro-grid. Such electrically connected buses and assets may be controlled by a supervisor controller 107 that is selected from a plurality of controllers 107.

On the other hand, if at least one breaker 105 is open then the configuration of the micro-grids may be different, e.g., power assets 101 associated with electrical buses 103 with open tie-breaker are electrically isolated and are operating independently. In one instance, input sorter 309 may group power assets 101 based on breaker positions such that each group belongs to a single micro-grid. In one instance, input sorter 309 may broadcast the information on each individual micro-grid to various calculation blocks to calculate the optimum dispatch for all asset types.

In one instance, controllers 107, e.g., microcontrollers that perform the processing and IO functions, are communicating with each other, e.g., in real-time, near real-time, per schedule, etc., within the peer-to-peer network. Controllers 107 may read, in real-time or near real-time, data pertaining to their respective power assets 101, and may transmit the data to input sorter 309. In step 311, input sorter 309 may forward the data to aggregation logic 313a-313b (collectively referred to as aggregation logic 313) for data aggregation. In one instance, aggregation logic 313 may group power assets 101 based on their type and may aggregate their data. Such data aggregation before transmission reduces the quantity of data that needs to flow between controllers 107 and lowers data traffic.

In one instance, data aggregation may allow for an efficient determination of dispatch commands by asset type. Such determination of dispatch commands by asset type may enable infinite scalability. For example, if a micro-grid has 1000 power assets, it may be beyond the capability of a single controller 107 to determine dispatch commands for each of the 1000 power assets. Hence, the plurality of controllers 107 in a peer-to-peer network may aggregate the 1000 power assets based on their types, e.g., gensets, energy storage systems, photovoltaic groups, fuel cell groups, power grid connections, etc. The plurality of controllers 107 may determine aggregate dispatch commands for each type of power assets 101 under their supervision, and may transmit the aggregate dispatch commands to each of individual controllers 107 that may handle dispatch for the 1000 power assets, e.g., by broadcasting the aggregate dispatch commands over the network. Each of the individual controllers 107 may process the received aggregate dispatch commands and may determine individual dispatch commands for each of the power assets 101. Aggregation of power assets by type may, in some embodiments, also result in an increased efficiency for determining dispatch commands, e.g., as compared to determining each dispatch command individually.

For example, in step 315, group level dispatch logic micro-grids control 317 may broadcast the aggregated data for the grouped power assets 101 across the peer-to-peer network or may transmit the aggregated data to a specific controller 107 that is designated as a supervisor for the isolated micro-grid. The supervisor controller 107 may solve the dispatch problem for the isolated micro-grid.

In step 319, asset-to-asset distribution logic 321 may calculate optimum dispatch between power assets 101 of the same type. Group level dispatch logic micro-grids control 317 and asset-to-asset distribution logic 321 may find the optimum solution to the power dispatch problem.

In step 323, output sorter 325 may distribute the commands, e.g., dispatch command, from a particular controller 107 to the individual isolated grids. In one instance, the output is based on the input order, e.g., the output is in the same order as the input.

Figure 4A:
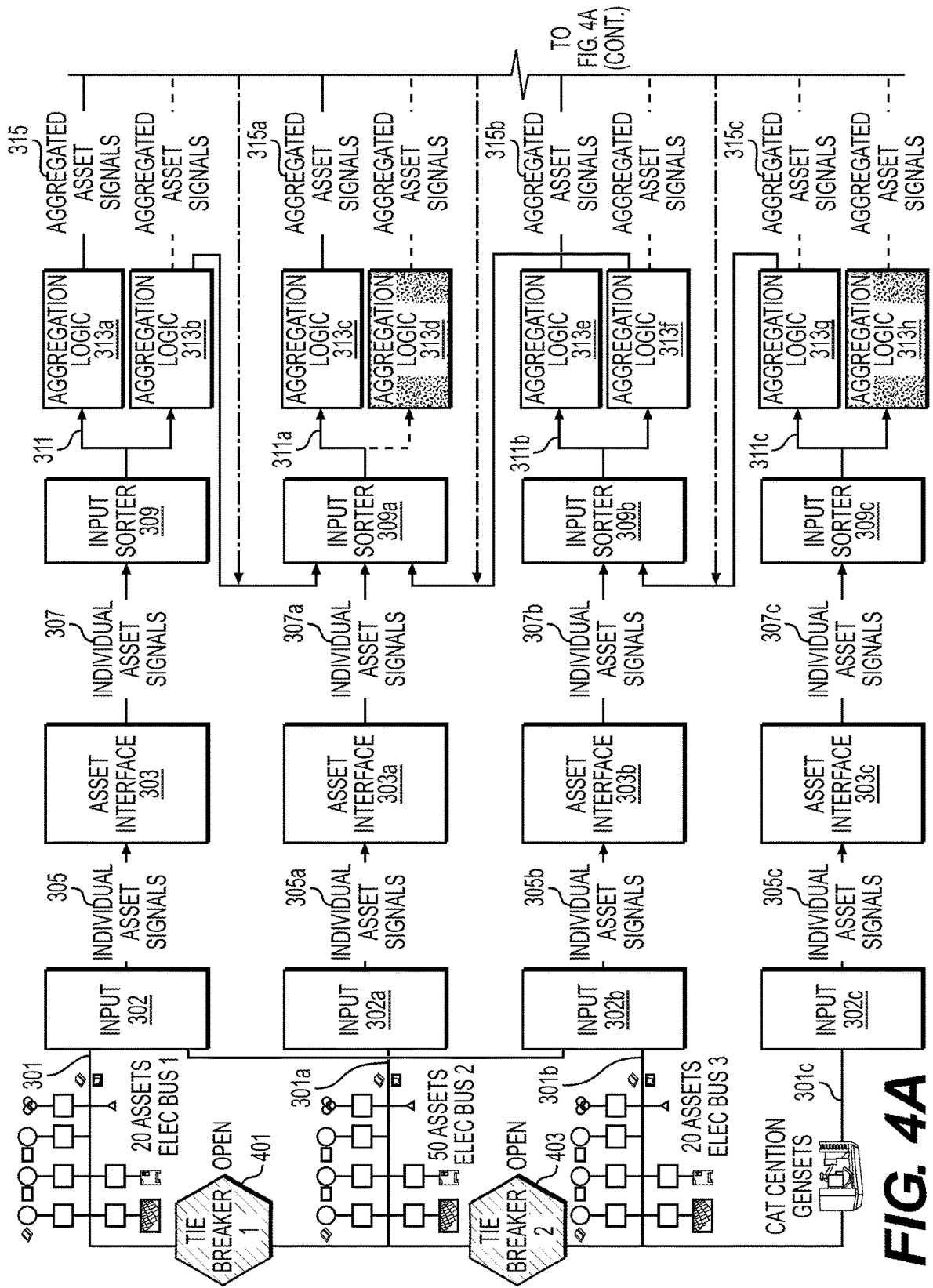
FIGS. 4A-4C are architecture diagrams that show micro-grids configuration in a distributed network based on breaker positions, according to aspects of the disclosure.
Figure 4B:
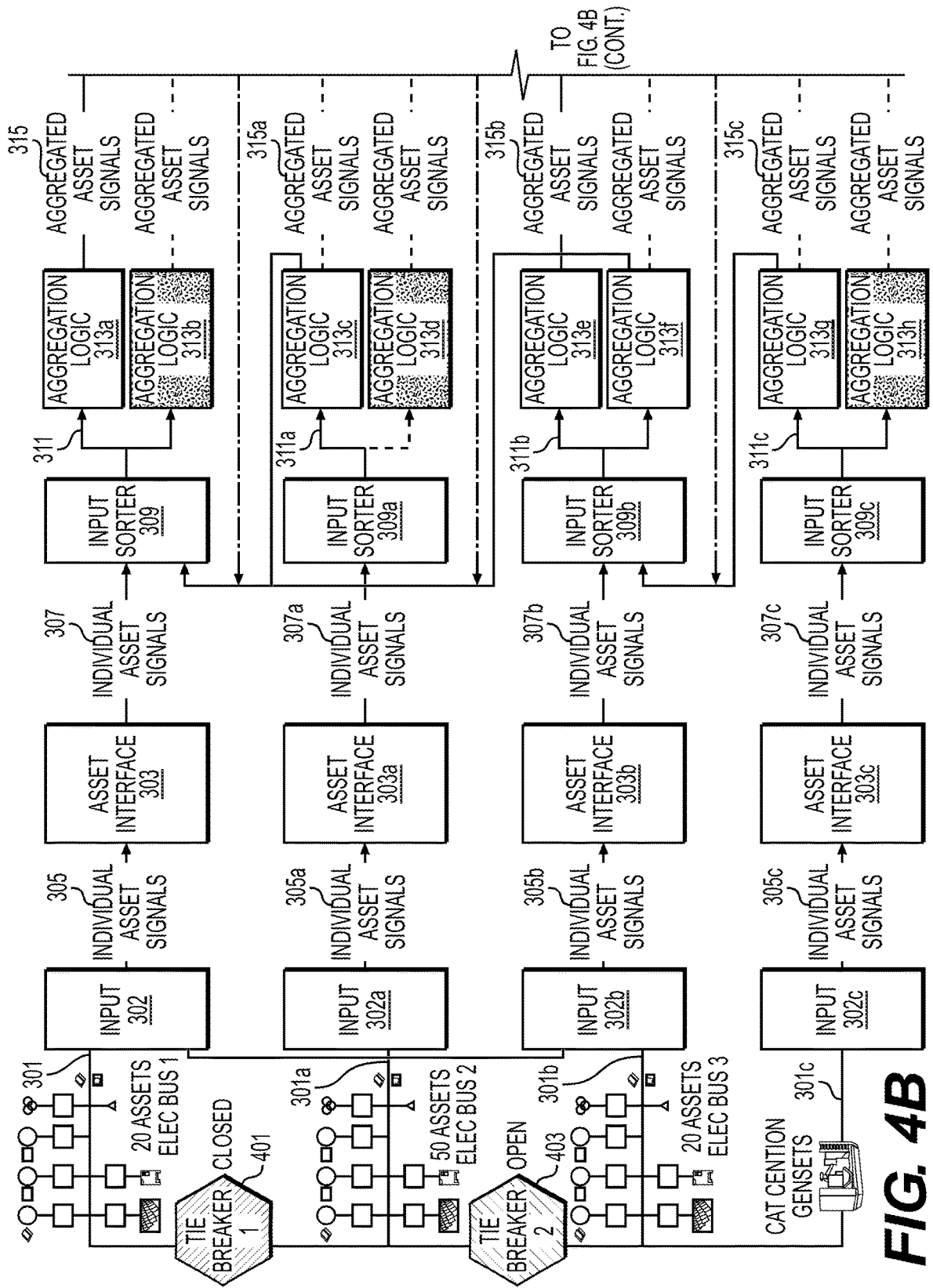
Figure 4C:
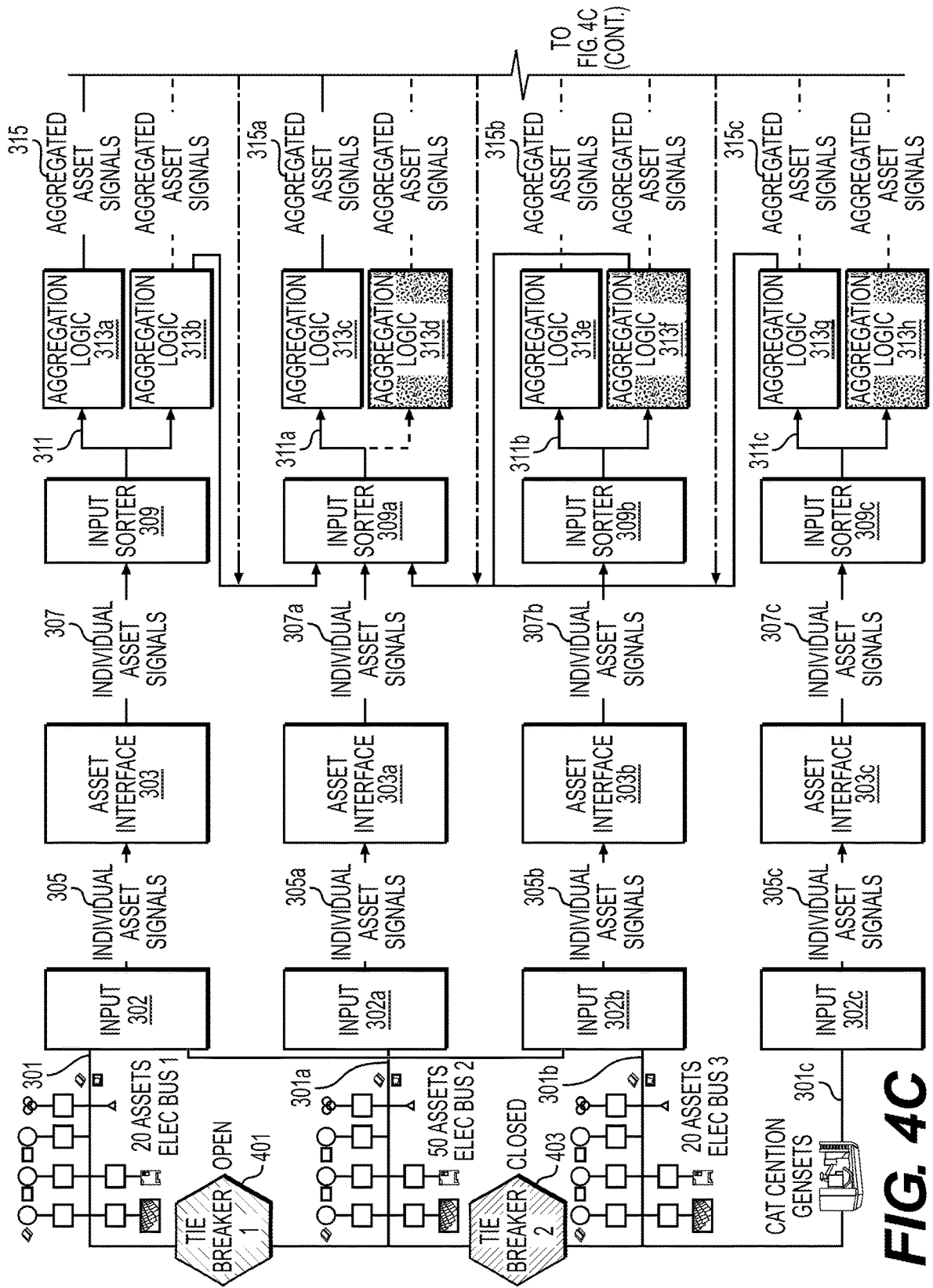
Figure 4C:
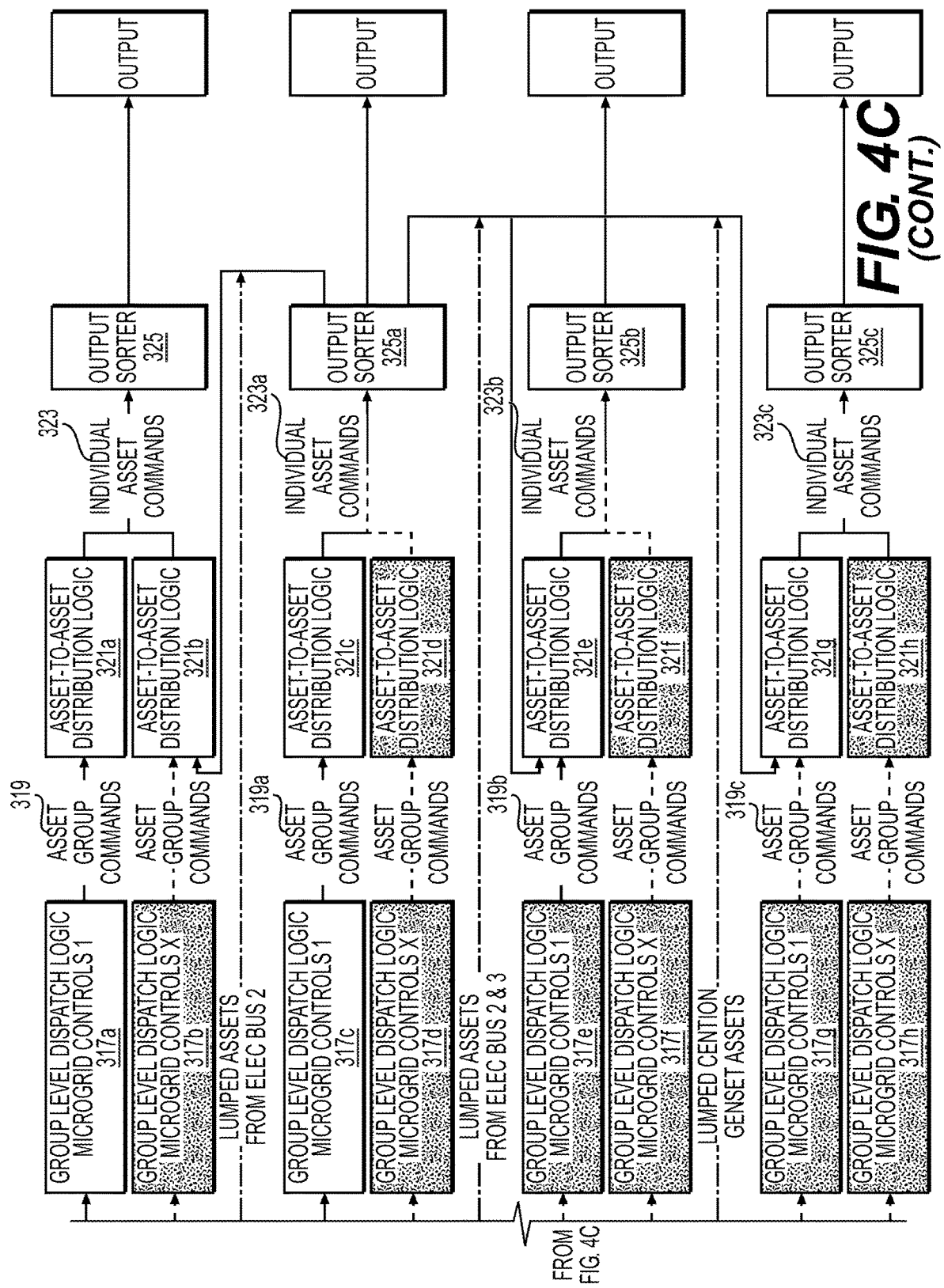

FIGS. 4A-4C are architecture diagrams that depict micro-grids configuration in a distributed network based on breaker positions, according to one example embodiment. As illustrated, FIGS. 4A-4C include electrical buses, e.g., electrical buses 1, 2, and 3, connected by breakers, e.g., tie-breakers 401 and 403. In one instance, the IO limitation of the controllers may be 30 power assets per controller. As depicted, electrical bus 1 may be connected to 20 power assets, electrical bus 2 may be connected to 50 power assets, and electrical bus 3 may be connected to 20 power assets. In one instance, breakers 401 and 403 may be in a closed position, whereupon electrical buses 1, 2, and 3 may form a single micro-grid. A group level dispatch logic with the lowest unique ID may be elected as the supervisor in each of the electrical buses 1, 2, and 3 to control a maximum of 30 power assets. For example, group level dispatch logic microgrids control 317a may control 20 power assets in electric bus 1 and 10 power assets in electric bus 2, group level dispatch logic microgrids control 317c may control 30 power assets in electric bus 2, and group level dispatch logic microgrids control 317e may control 10 power asset in electric bus 2 and 20 power assets in electric bus 3.

In FIG. 4A, electrical buses 1, 2, and 3 may operate independently of each other because breakers 401 and 403 are open. The independent electrical buses 1, 2, and 3 may be controlled by group level dispatch logic microgrids control 317a, 317c, and 317e, respectively. In one instance, during the closed position of breakers 401 and 403, data for 20 power assets in electrical bus 2 may be transmitted by group level dispatch logic microgrids control 317c of electrical bus 2 to group level dispatch logic microgrids control 317e of electrical bus 3. Since the micro-grids configuration changed, i.e., breakers 401 and 403 are open, the transmitted data for the 20 power assets in electrical bus 2 may be returned to group level dispatch logic micro-grids control 317c for efficient control of the entire 50 assets in electrical bus 2.

In FIG. 4B, electrical buses 1 and 2 are electrically connected because breaker 401 is closed, whereas electrical bus 3 is isolated because breakers 403 is open. The 20 power assets in electrical bus 1 and 50 power assets in electrical bus 2 may form a micro-grid of 70 power assets, and a simple rule-based approach, e.g., arbitration logic, may be implemented to designate group level dispatch logic micro-grids control 317a of electrical bus 1 as the supervisor for the 70 power assets. In one instance, 50 power assets in electrical bus 2 may be aggregated by group level dispatch logic micro-grids control 317c and then sent to group level dispatch logic micro-grids control 317a. Whereas, electrical bus 3 may operate independently, and group level dispatch logic micro-grids control 317e may operate as the active controller for electrical bus 3.

In FIG. 4C, electrical buses 2 and 3 are electrically connected because breaker 403 is closed, but electrical bus 1 is isolated because breakers 401 is open. Electrical bus 1 may operate independently, and group level dispatch logic micro-grids control 317a may operate as the active controller for electrical bus 1. On the other hand, the 50 power assets in electrical bus 2 and 20 power assets in electrical bus 1 may form a micro-grid of 70 power assets, and a simple rule-based approach, e.g., arbitration logic, may be implemented to designate group level dispatch logic micro-grids control 317c of electric bus 2 as the supervisor for the 70 power assets. In one instance, 20 power assets from electrical bus 3 may be aggregated by group level dispatch logic micro-grids control 317e and then transmitted to group level dispatch logic micro-grids control 317c for efficient control of the supervised assets.

INDUSTRIAL APPLICABILITY

The disclosed methods and systems for control of distributed energy resources may be used in any micro-grid-type system that sends and receives power. The methods and systems disclosed herein may provide robustness against a single point of failure, permits the addition of new resources, and lowers the transmission losses due to local power generation and consumption. In addition, the methods and systems disclosed herein may be adaptable to configurations ranging from a simple set-up, e.g., single-digit assets without tie-breakers, to a complex set-up, e.g., a large number of assets with multiple tie-breakers, multiple mini micro-grids, and multiple utility connections. The micro-grid according to the methods and systems disclosed herein may provide modularity and scalability, and may provide a mechanism for partitioning control functions among various modular controllers based on on-site configuration situations. In one instance, the disclosed micro-grid control system may be a peer-to-peer network of controllers that are connected via a ring network, wherein each node may have two physical paths into the network and is robust against disruptions at a single point. Such a ring network may allow for communication line disruptions, and increases reliability and robustness. In another instance, the disclosed micro-grid control system is capable of responding to changes in the micro-grid structure, e.g., tie-breaker positions, by assigning at least one controller to the isolated micro-grids. Each controller may be capable of controlling any isolated set of resources, e.g., grouped by one or more electrical bus, and may minimize the need to communicate, and when communication is necessary, may reduce the quantity of data that needs to flow between the controllers, by aggregating data before transmission. The disclosed micro-grid control system reduces the network bandwidth requirements by transmitting data only when required and reduces the quantity of data that needs to be transmitted.

Figure 5:
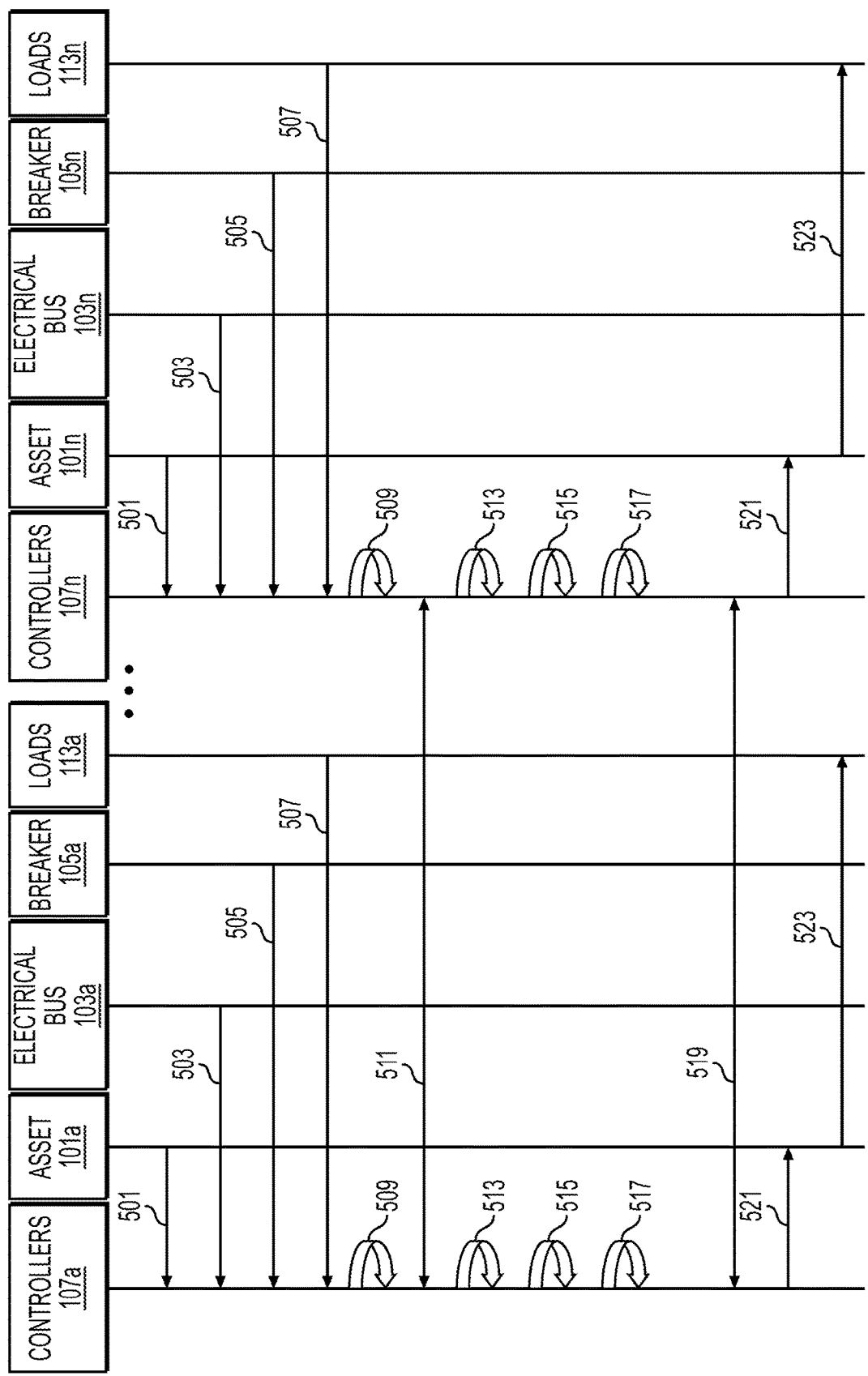
FIG. 5 is a ladder diagram that depicts a distributed control system for micro-grids control based on breaker positions, according to aspects of the disclosure.

FIG. 5 is a ladder diagram that illustrates a sequence of processes for micro-grids control based on breaker positions, according to one example embodiment. Although illustrated and described as a sequence of steps, it is contemplated that the process may be performed in any order or combination and need not include all of the illustrated steps. It should be understood that an exemplary micro-grid may include any suitable number of controllers 107a-n, any suitable number of assets 101a-n, any suitable number of electrical busses 103a-n, any suitable number of breakers 105a-n, and any suitable number of loads 113a-n. Further, it should be understood that the numbers of the foregoing components may differ from each other. In the following description, like elements may be referred to by their comment index. For example, an operation common to all controllers 107a-n may refer to controllers 107 in general.

In step 501, controllers 107 may receive, in real-time or near real-time, individual data from a plurality of power assets 101. In one instance, the individual data may include operational characteristics such as apparent power limits, a predetermined, regulated, and/or designed minimum load capacity, a maximum load capacity, total operational lifetime, current operational age, fuel consumption rate, power output, maintenance cost, replacement cost, etc.

In step 503, controllers 107 may receive, e.g., in real-time or near real-time, the configuration of associated electrical buses 103. For example, controller 107a may receive the configuration of one or more electrical busses 103 associated with controller 107, e.g., electrical bust 103a. In one instance, electrical buses 103 may be connected to their respective power assets 101, and may be electrically interconnected by breakers 105. In one instance, the configuration of electrical bus 103 may change based on the position of breaker 105. In one instance, controllers 107 may collectively receive data from the plurality of power assets 101 and configuration of electrical buses 103. In another instance, electrical buses 103 may receive data from the plurality of power assets 101, and may transmit the data to controllers 107.

In step 505, controllers 107 may receive, e.g., in real-time or near real-time, position information for breakers 105 that interconnects electrical buses 103. For example, controller 107a may receive position information from connected breaker 105a. In one instance, breakers 105 may open or close automatically, manually, per schedule, per demand, or a combination thereof. In one instance, if breakers 105 are open then electrical buses 103 are not interconnected, preventing power from flowing through electrical buses 103. In another instance, if breakers 105 are closed then electrical buses 103 are connected, allowing power to flow through the interconnected electrical buses 103.

In step 507, controllers 107 may receive, in real-time or near real-time, data associated with loads 113, e.g., the amount of power needed by loads 113. In one instance, controllers 107 may process historical information on loads 113 to generate a load forecast that predicts or estimates an amount of power needed by the load at, for example, different times of day, different days of the week, in different seasons, during different weather or ambient temperature conditions, etc. Any suitable forecasting technique may be used, such as averaging over a plurality of historical scheduling periods.

In step 509, controllers 107 may process the information received from power assets 101, electrical buses 103, breakers 105, and loads 113. In one instance, controllers 107 may convert varying measurements from a plurality of power assets 101 to a uniform measurement that is familiar to controllers 107. In one instance, controllers 107 may sort and aggregate the data from power assets 101 based, at least in part, on data types, power assets types, or a combination thereof.

In step 511, controllers 107 may broadcast micro-grid configuration information over the peer-to-peer network to other controllers 107 and/or may receive a broadcast of micro-grid configuration information from other controllers 107. In one instance, the micro-grid configuration may include a quantity or position of breaker 105, a quantity, status, or load of controllers 107, a quantity or status of power assets 101, and/or a requirement or status of loads 113.

In step 513, controllers 107 may process micro-grid configuration information to segment micro-grid into isolated grids. In one instance, micro-grid may be segmented into isolated grids based, at least in part, on the position of breakers 105 that interconnect electrical buses 103. In one instance, controller 107 may assign or identify at least one controller 107 to supervise power assets 101 of the isolated grids. In one instance, assignment or identification of at least one controller 107 to supervise power assets 101 of the isolated grids may be based, at least in part, on the lowest unique ID, capacity information, or a combination thereof of at least one controller 107.

In step 515, supervisor controller 107 may determine dispatch commands, e.g., for individual power assets 101 and/or an aggregated set of power assets 101 and/or electrical buses 103 of the isolated grids it is supervising. In one instance, supervisor controller 107 may determine the dispatch commands for the aggregated set of power assets 101 and/or electrical buses 103 based, at least in part, on an optimal power dispatch.

In step 517, supervisor controller 107 may broadcast the dispatch commands of the isolated grids it is supervising over the peer-to-peer network to other controllers 107.

In step 519, other controllers 107 may determine and/or sort individual dispatch commands from the aggregate commands for power assets 101 for which they are acting as handlers.

In step 521, other controllers 107 may transmit the individual dispatch commands to the respective power assets 101 they are handling.

In step 523, power assets 101 may supply power to loads 113 based, at least in part, on the dispatch commands.

In some instances, a component may be added or removed from the micro-grid. In such circumstances, one or more of the foregoing steps 501-523 may be repeated. In some instances, the method above may be performed continuously, periodically, in response to a user instruction, in response to detection of a change in the micro-grid, or the like.

In some instances, controllers 107 may operate asynchronously. For example, a micro-grid configuration may be broadcast from various controllers 107 at various times. A particular controller 107, e.g., controller 107a, in some embodiments, may proceed past step 511 without waiting for receipt of micro-grid configuration information from any other particular controller 107. In embodiments in which the method is performed continuously or periodically, a lagging of micro-grid configuration data from one or more other controllers 107 may be accounted for in a next iteration of the method. Further, in some embodiments, controllers 107 may be configured to continuously, periodically, and/or passively listen for broadcast data, and/or may be configured to buffer such received data until that controller 107 reaches the appropriate step in the method. In some instances, such asynchronous operation may improve the efficiency of the control of the micro-grid, e.g., by reducing the extent or risk of blocking the method by a lagging controller 107. In some instances, controllers 107 may further operate at different timings or rates, e.g., based on the capability or capacity of the controllers 107. An asynchronous operation such as the foregoing may facilitate such different operation timing.

Figure 6:
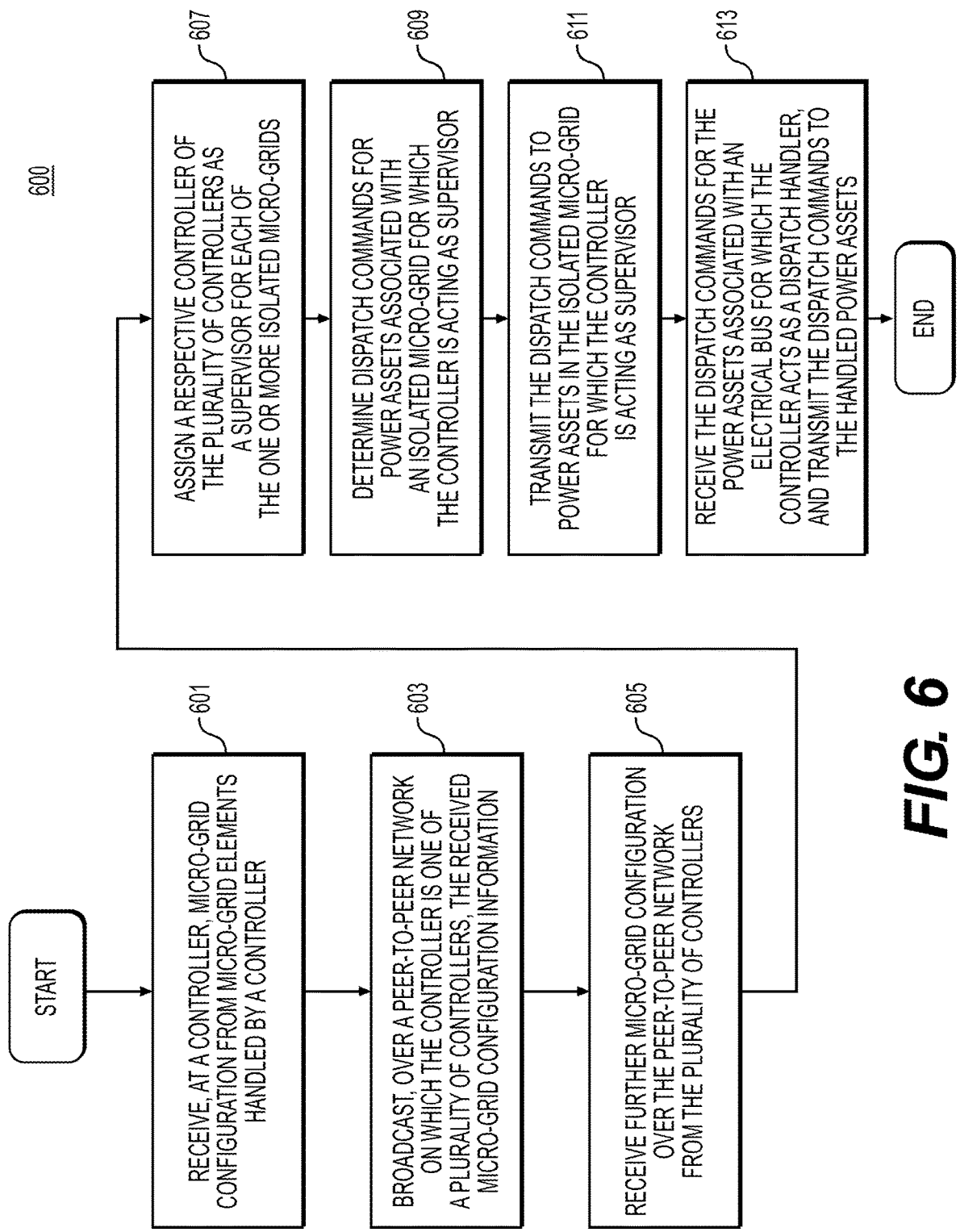
FIG. 6 is a flowchart of a process for a distributed micro-grid control system, according to aspects of the present disclosure.

FIG. 6 is a flowchart of a process for a distributed micro-grid control system, according to one example embodiment. In various embodiments, controllers 107 and/or any of modules 201-211 may provide means for accomplishing various parts of process 600, as well as means for accomplishing embodiments of other processes described herein in conjunction with other components of process 600. Although process 600 is illustrated and described as a sequence of steps, it is contemplated that various embodiments of process 600 may be performed in any order or combination and need not include all of the illustrated steps.

For various reasons, or in various circumstances, as discussed in one or more examples above, the configuration of a micro-grid may change. For example, positions(s) of breaker(s), and/or the presence or operability of various components or load demands may change.

In step 601, controller 107 may receive micro-grid configuration from micro-grid elements handled by the controller 107. In one instance, micro-grid configuration information includes position information for breakers 105. In one instance, micro-grid configuration information further includes a quantity or position of breakers 105 that electrically interconnect electrical buses 103, a quantity, status, or a load of controllers 107, a quantity or status of power assets 101, and/or a requirement or status of loads 113.

In step 603, controller 107 may broadcast, over a peer-to-peer network on which controller 107 is one of a plurality of controllers 107, the micro-grid configuration information received from the micro-grid elements handled by the controller 107.

In step 605, controller 107 may receive further micro-grid configuration information from the plurality of controllers 107 over the peer-to-peer network, e.g., that includes micro-grid configuration for micro-grid elements handled by the plurality of controllers 107, respectively.

In step 607, controller 107 may assign a respective controller 107 of the plurality of controllers 107 as a supervisor for each of the one or more isolated micro-grids. In one instance, controller 107 may segment electrical buses 103 connected to the controllers 107 into isolated micro-grids, and may assign a controller 107 as a supervisor for each of the isolated micro-grids. The assignment may be based, for example, on the micro-grid configuration information and the further micro-grid configuration information. The assignment may be applied, for example, according to a predetermined algorithm or technique.

In step 609, controller 107 may determine dispatch commands for power assets associated with an isolated micro-grid for which the controller is acting as a supervisor. In one instance, the determined dispatch commands may be aggregated commands by asset type and/or load requirements. In one instance, the determined dispatch commands is broadcasted over the peer-to-peer network.

In step 611, controller 107 may broadcast over the peer-to-peer network the dispatch commands to power assets 101 in the isolated micro-grid for which the controller is acting as supervisor.

In step 613, controller 107 may receive, via the peer-to-peer network, the dispatch commands for power assets 101 associated with electrical bus 103 for which controller 107 acts as a dispatch handler, and may transmit the dispatch commands to the handled power assets to handle the load requirements. In one instance, transmitting the dispatch commands may include determining individual commands based on aggregate commands, and then transmitting the individual commands to individual assets 101. In one instance, controllers 107 may determine, in real-time or near real-time, load requirements for loads 113 and power generation capacity of power assets 101. For example, controllers 107 may process historical data, e.g., past power generation information, of power assets 101 to determine their power generation capability. For example, controllers 107 may process historical information of loads 113 to predict or estimate the amount of power needed by load 113. Micro-grid 100 may distribute loads across controllers 107 based, at least in part, on the power generation capacity of power assets 101 controlled by controllers 107 to handle the load requirements.

The above-disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. It is intended that the specification and examples be considered as exemplary only, with a true scope of the disclosure being indicated by the following claims and their equivalents. Accordingly, the disclosure is not to be restricted except in the light of the attached claims and their equivalents.

What is claimed is:

1. A distributed micro-grid control system, comprising:
a plurality of controllers connected to each other in a peer-to-peer network, wherein:
  each controller of the plurality of controllers is configured to:
  act as a dispatch handler for one or more electrical buses from a plurality of electrical buses that, in each case, are connected to a respective set of power assets and loads;
  process historical data for the respective set of power assets to determine power generation capability, wherein the historical data includes past power generation information;
  broadcast the power generation capability over the peer-to-peer network to the plurality of controllers to manage power supply distribution to a plurality of loaders connected to the plurality of controllers;
  the plurality of controllers are further configured to broadcast micro-grid configuration information over the peer-to-peer network to each controller;
  each controller is further configured to determine, based on the micro-grid configuration information:
    a segmentation of the plurality of electrical buses into one or more isolated micro-grids; and
    an assignment of a respective controller of the plurality of controllers as a supervisor for each of the one or more isolated micro-grids;
  the plurality of controllers are further configured such that each controller assigned as the supervisor to an isolated micro-grid is configured to determine dispatch commands for power assets associated with the isolated micro-grid to handle load requirements and broadcast the determined dispatch commands over the peer-to-peer network; and each controller is further configured to transmit determined dispatch commands to power assets electrically connected to the one or more electrical buses for which the controller acts as dispatch handler to handle the load requirements.

2. The distributed micro-grid control system of claim 1, wherein the plurality of electrical buses are electrically interconnected by one or more breakers, and wherein the micro-grid configuration information includes position information for the one or more breakers.

3. The distributed micro-grid control system of claim 1, wherein the micro-grid configuration information further includes information regarding one or more of:

a quantity or position of one or more breakers that electrically interconnect the plurality of electrical buses;

a quantity, status, or load of the plurality of controllers;

a quantity or status of the respective sets of power assets; and a requirement or status of a plurality of loads.

4. The distributed micro-grid control system of claim 3, wherein, in response to a change in the micro-grid configuration information, the plurality of controllers are further configured to update one or more of: (i) the segmentation of the plurality of electrical buses into the one or more isolated micro-grids, or (ii) the assignment of the respective controller of the plurality of controllers as the supervisor for each of the one or more isolated micro-grids, based on the change to the micro-grid configuration information.

5. The distributed micro-grid control system of claim 4, wherein the peer-to-peer network is an ad hoc network configured to add or remove at least one controller, add or remove at least one electrical bus and accompanying set of power assets, add or remove at least one breaker, or a combination thereof.

6. The distributed micro-grid control system of claim 1, wherein a number of controllers from the plurality of controllers assigned as the supervisor to an isolated micro-grid equals a number of the isolated micro-grids, and wherein each of the one or more isolated micro-grids operate independently and asynchronously.

7. The distributed micro-grid control system of claim 1, wherein each controller of the plurality of controllers is further configured to:

classify the set of power assets based, at least in part, on asset type;

aggregate the classified set of power assets;

determine an optimal power dispatch for the aggregated set of assets; and determine the dispatch commands for the power assets based, at least in part, on the optimal power dispatch.

8. The distributed micro-grid control system of claim 1, wherein the plurality of controllers in the peer-to-peer network are connected in a ring architecture configured to provide network redundancy.

9. The distributed micro-grid control system of claim 1, wherein the set of power assets include one or more gensets, an energy storage system, a photovoltaic group, a fuel cell group, a power grid connection, a wind turbine, a hydro turbine, a pumped hydro, or a combination thereof.

10. A distributed micro-grid, comprising:

a plurality of power assets;

a plurality of electrical buses, each electrical bus electrically connected to a respective set of the plurality of power assets; and a plurality of controllers connected to each other in a peer-to-peer network, wherein:

each controller of the plurality of controllers is configured to:

act as a dispatch handler for one or more electrical buses from the plurality of electrical buses that, in each case, are connected to a respective set of power assets and loads;

process historical data for the respective set of power assets to determine power generation capability, wherein the historical data includes past power generation information;

broadcast the power generation capability over the peer-to-peer network to the plurality of controllers to manage power supply distribution to a plurality of loaders connected to the plurality of controllers;

the plurality of controllers are further configured to broadcast micro-grid configuration information over the peer-to-peer network to each controller;

each controller is further configured to determine, based on the micro-grid configuration information:

a segmentation of the plurality of electrical buses into one or more isolated micro-grids; and an assignment of a respective controller of the plurality of controllers as a supervisor for each of the one or more isolated micro-grids;

the plurality of controllers are further configured such that each controller assigned as the supervisor to an isolated micro-grid is configured to determine dispatch commands for power assets associated with the isolated micro-grid to handle load requirements and broadcast the determined dispatch commands over the peer-to-peer network; and each controller is further configured to transmit determined dispatch commands to power assets electrically connected to the one or more electrical buses for which the controller acts as a dispatch handler to handle the load requirements.

11. The distributed micro-grid of claim 10, further comprising:

one or more breakers, wherein the plurality of electrical buses are electrically interconnected by the one or more breakers, and wherein the micro-grid configuration information includes position information for the one or more breakers.

12. The distributed micro-grid of claim 10, wherein the micro-grid configuration information further includes information regarding one or more of:

a quantity or position of one or more breakers that electrically interconnect the plurality of electrical buses;

a quantity, status, or load of the plurality of controllers;

a quantity or status of the respective sets of power assets; and a requirement or status of a plurality of loads.

13. The distributed micro-grid of claim 12, wherein, in response to a change in the micro-grid configuration information, the plurality of controllers are further configured to update one or more of: (i) the segmentation of the plurality of electrical buses into the one or more isolated micro-grids, or (ii) the assignment of the respective controller of the plurality of controllers as the supervisor for each of the one or more isolated micro-grids, based on the change to the micro-grid configuration information.

14. The distributed micro-grid of claim 13, wherein the peer-to-peer network is an ad hoc network configured to add or remove at least one controller, add or remove at least one electrical bus and accompanying set of power assets, add or remove at least one breaker, or a combination thereof.

15. The distributed micro-grid of claim 10, wherein a number of controllers from the plurality of controllers assigned as the supervisor to an isolated micro-grid equals a number of the isolated micro-grids, and wherein each of the one or more isolated micro-grids operate independently and asynchronously.

16. A controller for a distributed micro-grid control system, comprising:
at least one memory storing instructions; and
at least one processor operatively connected to the at least one memory and configured to execute the instructions to perform operations, including:
process historical data for a respective set of power assets to determine power generation capability, wherein the historical data includes past power generation information;
broadcasting, over a peer-to-peer network on which the controller is one of a plurality of controllers, micro-grid configuration information and the determined power generation capability to the plurality of controllers to manage power supply distribution;
determining, based on the micro-grid configuration information and the power generation capability provided over the peer-to-peer network:
a segmentation of a plurality of electrical buses connected to the plurality of controllers into one or more isolated micro-grids; and
an assignment of a respective controller of the plurality of controllers as a supervisor for each of the one or more isolated micro-grids;
in response to the assignment of the controller as the supervisor for one of the one or more isolated micro-grids:
determining dispatch commands for power assets associated with the isolated micro-grid to handle load requirements; and
broadcasting the determined dispatch commands over the peer-to-peer network; and
in response to receiving, via the peer-to-peer network, the dispatch commands for power assets associated with one or more electrical buses for which the controller acts as a dispatch handler, transmitting the dispatch commands to the associated power assets to handle load requirements.

17. The controller for the distributed micro-grid control system of claim 16, wherein the plurality of electrical buses are electrically interconnected by one or more breakers, and wherein the micro-grid configuration information includes position information for the one or more breakers.

18. The controller for the distributed micro-grid control system of claim 16, wherein the micro-grid configuration information further includes information regarding one or more of:
a quantity or position of one or more breakers that electrically interconnect the plurality of electrical buses;
a quantity, status, or load of the plurality of controllers;
a quantity or status of the power assets; and
a requirement or status of a plurality of loads.

19. The controller for the distributed micro-grid control system of claim 18, wherein, in response to a change in the micro-grid configuration information, the controller is further configured to update one or more of (i) the segmentation of the plurality of electrical buses into the one or more isolated micro-grids, or (ii) the assignment of the respective controller of the plurality of controllers as the supervisor for each of the one or more isolated micro-grids, based on the change to the micro-grid configuration information.

* * * * *